US009287565B2

(12) United States Patent
Atanassova et al.

(10) Patent No.: US 9,287,565 B2
(45) Date of Patent: Mar. 15, 2016

(54) CARBON BLACKS AND USE IN ELECTRODES FOR LEAD ACID BATTERIES

(71) Applicant: Cabot Corporation, Boston, MA (US)

(72) Inventors: Paolina Atanassova, Albuquerque, NM (US); Berislav Blizanac, Albuquerque, NM (US); Kenneth C. Koehlert, Albuquerque, NM (US); Geoffrey D. Moeser, Reading, MA (US); Miodrag Oljaca, Albuquerque, NM (US); Yipeng Sun, Albuquerque, NM (US); Danny Pierre, Malden, MA (US); Jeffrey S. Sawrey, Westford, MA (US)

(73) Assignee: Cabot Corporation, Boston, MA (US)

( * ) Notice: Subject to any disclaimer, the term of this patent is extended or adjusted under 35 U.S.C. 154(b) by 321 days.

(21) Appl. No.: 13/856,825

(22) Filed: Apr. 4, 2013

(65) Prior Publication Data

US 2013/0295462 A1 Nov. 7, 2013

Related U.S. Application Data

(63) Continuation of application No. 13/724,440, filed on Dec. 21, 2012, now abandoned.

(60) Provisional application No. 61/578,994, filed on Dec. 22, 2011.

(51) Int. Cl.
*H01M 4/13* (2010.01)
*H01M 4/62* (2006.01)
(Continued)

(52) U.S. Cl.
CPC .............. *H01M 4/625* (2013.01); *C09C 1/56* (2013.01); *H01M 4/14* (2013.01); *C01P 2006/12* (2013.01); *C01P 2006/14* (2013.01);
(Continued)

(58) Field of Classification Search
None
See application file for complete search history.

(56) References Cited

U.S. PATENT DOCUMENTS 5,156,935 A * 10/1992 Hohjo et al. .................. 429/225
2003/0049528 A1* 3/2003 Honbo et al. ................. 429/209
(Continued)

FOREIGN PATENT DOCUMENTS

CN 1692144 A 11/2005
EP 1737916 B1 8/2012
(Continued)

OTHER PUBLICATIONS

Gruber et al., Raman Studies of Heat-Treated Carbon Blacks, Carbon, vol. 32, No. 7, pp. 1377-1382, 1994.*
(Continued)

*Primary Examiner* — Patrick Ryan
*Assistant Examiner* — Jose Colucci Rios

(57) ABSTRACT

A carbon black having a combination of properties with values in ranges selected to promote high conductivity, high hydrophobicity, and reduced outgassing in lead acid batteries while maintaining high charge acceptance and cycleability. The carbon black has a Brunauer-Emmett-Teller (BET) surface area ranging from 100 $m^2/g$ to 1100 $m^2/g$ combined with one or more properties, e.g., a surface energy (SE) of 10 $mJ/m^2$ or less, and/or a Raman microcrystalline planar size ($L_a$) of at least 22 Å, e.g., ranging from 22 Å to 50 Å. In some cases, the carbon black has a statistical thickness surface area (STSA) of at least 100 $m^2/g$, e.g., ranging from 100 $m^2/g$ to 600 $m^2/g$.

18 Claims, 12 Drawing Sheets

(51) Int. Cl.
  *C09C 1/56* (2006.01)
  *H01M 4/14* (2006.01)
  *H01M 4/56* (2006.01)
  *H01M 10/06* (2006.01)

(52) U.S. Cl.
  CPC ........ *C01P 2006/40* (2013.01); *C01P 2006/90* (2013.01); *H01M 4/56* (2013.01); *H01M 10/06* (2013.01); *Y02E 60/126* (2013.01)

(56) References Cited

U.S. PATENT DOCUMENTS

| | | | |
|---|---|---|---|
| 2006/0216607 A1* | 9/2006 | Takeuchi et al. | 429/232 |
| 2006/0264561 A1* | 11/2006 | Green et al. | 524/496 |
| 2012/0171564 A1* | 7/2012 | Jagannathan et al. | 429/205 |
| 2013/0108776 A1* | 5/2013 | Li et al. | 427/8 |

FOREIGN PATENT DOCUMENTS

| | | |
|---|---|---|
| GB | 1485261 | 9/1977 |
| JP | 61/066759 | 4/1986 |
| JP | 05/335012 | 12/1993 |
| JP | 10130424 A | 5/1998 |
| JP | 2008/098009 A | 4/2008 |
| WO | WO 97/03133 | 1/1997 |
| WO | WO2005/028569 A2 | 3/2005 |
| WO | WO 2007/013678 A2 | 2/2007 |
| WO | WO 2009/105076 A1 | 8/2009 |
| WO | WO 2011/053668 A1 | 5/2011 |
| WO | WO2011/053668 A1 | 5/2011 |

OTHER PUBLICATIONS

XP-002693596, Database WPI, Week 199830, Thomson Scientific, Lond, GB; An 1998-343393.

International Search Report and the Written Opinion of the International Searching Authority, or the Declaration of International Application No. PCT/US2012/071269, mailed on Mar. 25, 2013.

International Preliminary Report on Patentability of International Application No. PCT/US2012/071269, mailed on Jul. 3, 2014.

Gruber, et al., Raman Studies of Heat-treated Carbon Blacks, Carbon, vol. 32, No. 7, pp. 1377-1382, 1994.

* cited by examiner

CARBON BLACKS AND USE IN ELECTRODES FOR LEAD ACID BATTERIES

This application is a continuation of and claims priority to U.S. patent application Ser. No. 13/724,440, filed on Dec. 21, 2012, which claims priority to U.S. Provisional Patent Application No. 61/578,994, filed on Dec. 22, 2011, the disclosure of which is incorporated herein by reference.

FIELD OF THE INVENTION

Disclosed herein are carbon blacks, such as heat-treated carbon blacks that can be used in electrodes and lead acid batteries.

BACKGROUND

Applications such as microhybrid cars and storage for renewable energy sources are placing strong demands on lead acid batteries in terms of improved cycleability at high rate-partial state of charge (HRPSoC) conditions and high dynamic charge acceptance (DCA). Benefits of carbon additives in reducing negative plate sulfation and improving the cycleability and charge acceptance of valve regulated lead acid (VRLA) batteries have been demonstrated. Suitable carbon additives include carbon blacks. Carbon blacks are carbon materials with a unique hierarchical structure made from oil feedstock in a high temperature, high throughput process. Characteristics of carbon blacks such as morphology, purity and surface properties have been studied in the context of lead acid battery applications.

SUMMARY

In a first general aspect, a carbon black has a Brunauer-Emmett-Teller (BET) surface area ranging from 100 $m^2/g$ to 1100 $m^2/g$ and a surface energy (SE) of 10 $mJ/m^2$ or less.

In a second general aspect, a heat-treated carbon black is prepared by a process including heating a carbon black at a temperature ranging from 1100° C. to 1700° C. in an inert atmosphere to form the heat-treated carbon black. The heat-treated carbon black has a Brunauer-Emmett-Teller (BET) surface area ranging from 100 $m^2/g$ to 1100 $m^2/g$ and a surface energy (SE) of 10 $mJ/m^2$ or less.

In a third general aspect, a heat-treated carbon black is prepared by a process including heating a carbon black at a temperature ranging from 1100° C. to 1700° C. in an inert atmosphere to form the heat-treated carbon black. The heat-treated carbon black has a Brunauer-Emmett-Teller (BET) surface area ranging from 100 $m^2/g$ to 1100 $m^2/g$ and a Raman microcrystalline planar size ($L_a$) of at least 22 Å, at least 25 Å, e.g., ranging from 22 Å to 50 Å, or from 25 Å to 50 Å.

In a fourth general aspect, a composition includes lead oxide and the carbon black or heat-treated carbon black of any one of the first, second, or third general aspects and/or implementations thereof. The composition includes 0.1 wt % to 5 wt % of the carbon black or heat-treated carbon black relative to the lead oxide. In some embodiments, the composition is a paste.

In a fifth general aspect, an electrode includes an electrically conductive substrate and a material supported by a surface of the electrically conductive substrate. The material includes the carbon black or heat-treated carbon black of any one of the first, second, or third general aspects and/or implementations thereof or the composition of the fourth general aspect and/or implementations thereof.

In a sixth general aspect, a lead acid battery includes a first electrode, a second electrode, and an electrolyte in contact with the first electrode and the second electrode. The first electrode may be the electrode of the fifth general aspect and/or implementations thereof.

A seventh general aspect includes heating a carbon black at a temperature ranging from 1100° C. to 1700° C. in an inert atmosphere to form a heat-treated carbon black. The heat-treated carbon black has a Brunauer-Emmett-Teller (BET) surface area ranging from 100 $m^2/g$ and 1100 $m^2/g$ and a surface energy (SE) 10 $mJ/m^2$ or less.

An eighth general aspect includes heating a carbon black at a temperature ranging from 1100° C. to 1700° C. in an inert atmosphere to form a heat-treated carbon black. The heat-treated carbon black has a Brunauer-Emmett-Teller (BET) surface area ranging from 100 $m^2/g$ and 1100 $m^2/g$ and a Raman microcrystalline planar size ($L_a$) ranging from 22 Å to 50 Å.

Implementations of the general aspects above may include one or more of the following features. For example, the carbon black or heat-treated carbon black may have a Raman microcrystalline planar size ($L_a$) of at least 22 Å or at least 25 Å. In some cases, the carbon black or heat-treated carbon black has a Raman microcrystalline planar size ($L_a$) of 50 Å or less. In certain cases, the carbon black or heat-treated carbon black has a surface energy (SE) of 10 $mJ/m^2$ or less, 9 $mJ/m^2$ or less, 6 $mJ/m^2$ or less, or 3 $mJ/m^2$ or less. In some examples, the carbon black or heat-treated carbon black has a statistical thickness surface area (STSA) of at least 100 $m^2/g$, e.g., ranging from 100 $m^2/g$ to 600 $m^2/g$.

The carbon black or heat-treated carbon black, materials, and compositions of the general aspects and/or implementations thereof as described above can be used in lead acid batteries (e.g., in one or more electrodes of a lead acid battery) to improve conductivity and reduce outgassing while maintaining high charge acceptance and cycleability.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWING(S)

The concepts herein may be more completely understood in consideration of the following detailed description of various embodiments in connection with the accompanying drawings, in which.

DETAILED DESCRIPTION

Figure 1:
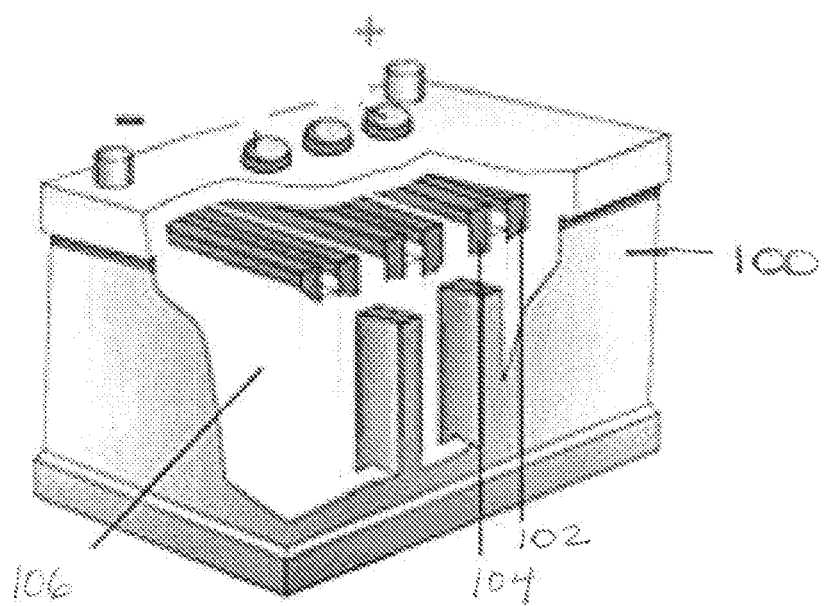
FIG. 1 depicts a lead acid battery.

Referring to FIG. 1, lead acid battery 100 is an electrochemical storage battery including first electrode 102, second electrode 104, and electrolyte 106. Electrolyte 106 generally includes aqueous sulfuric acid. Electrodes 102 and 104 are typically plates held in a parallel orientation and electrically isolated by a porous separator to allow movement of ions. As shown in FIG. 1, first electrode 102 is a positive battery plate including a current collector (e.g., a metal plate or grid) covered with a layer of positive, electrically conductive lead dioxide ($PbO_2$) on the surface; second electrode 104 is a negative battery plate including a current collector covered with a negative, active material, such as lead metal (Pb). A lead acid battery generally includes a multiplicity of negative and positive plates.

Negative plates of lead acid batteries are typically produced by applying a paste including lead oxide powder and sulfuric acid to electrically conductive lead alloy structures known as grids. After the plates have been cured and dried, the plates can be assembled into a battery and charged to convert the lead oxide into Pb. In some cases, an expander mixture is added to the lead oxide/sulfuric acid paste to improve the performance of the negative plate. The expander mixture may include, for example, barium sulfate as a nucleating agent for lead sulfate produced when the plate is discharged, carbon to increase the electrical conductivity of the active material in the discharged state, and a lignosulfonate or other organic material to increase the surface area of the active material and to assist in stabilizing the physical structure of the active material.

During discharge cycles, Pb supplied by the negative plate reacts with ionized sulfuric acid electrolyte to form lead sulfate ($PbSO_4$) on the surface of the negative plate, while $PbO_2$ on the positive plate reacts to form $PbSO_4$ on or near the positive plate. During charging cycles, $PbSO_4$ on the surface of the negative plate reacts to form Pb, and $PbSO_4$ on the surface of the positive plate reacts to form $PbO_2$. Thus, a charging cycle converts $PbSO_4$ into Pb and $PbO_2$, and a discharge cycle releases stored electrical potential by converting $PbO_2$ and Pb into $PbSO_4$.

Lead acid batteries are produced in flooded cell and valve regulated configurations. In flooded cell batteries, the electrodes/plates are immersed in electrolyte and gases created during charging are vented to the atmosphere. Valve regulated lead acid (VRLA) batteries include a one-way valve that inhibits external gases from entering the battery and allows internal gases, such as oxygen generated during charging, to escape if internal pressure exceeds a selected threshold. In VRLA batteries, the electrolyte is typically immobilized either by absorption of the electrolyte into a glass mat separator or by gelling the sulfuric acid with silica particles.

Carbon as an additive (e.g., in the form of carbon black) enables high dynamic charge acceptance and improved cycle life (cycleability) of both flooded and VRLA lead acid batteries. It is generally believed that high surface area carbon in the negative plate forms a conductive network within the lead sulfate matrix of a discharged negative plate. This conductive matrix is thought to facilitate a high recharge rate by providing a conductive path for the electrochemical conversion of lead sulfate back to lead, therefore inhibiting formation of large lead sulfate crystallites and minimizing their growth on the plate surface. The effect is greater with the addition of larger amounts of carbon and also increases as the surface area of the carbon increases.

The use of high surface area carbon in lead acid batteries, however, can lead to high gassing rates thought to be related to hydrogen evolution, and high loading of carbon can reduce cycleability. Water decomposition occurs above the water decomposition voltage in a lead acid battery, with decomposition rate and the resulting volumes of oxygen and hydrogen increasing along with overpotential. In addition, the potential of hydrogen evolution on carbon surfaces is lower than on lead and therefore the presence of carbon could lead to an increased rate of hydrogen evolution and therefore higher water loss.

The potential impact of hydrogen outgassing can be serious. At levels approaching 4% concentration, hydrogen gas build-up can present safety hazards. Over the life of a flooded lead acid battery, the rate of outgassing influences watering maintenance, as the greater the outgassing, the greater the need to ensure that proper electrolyte levels are maintained in the battery. For maintenance-free flooded lead acid batteries, high water loss increases electrolyte concentration and lowers cycle life. Dry out from water loss is also a possible failure mode in VLRA batteries.

Similar to hydrogen evolution reactions at platinum and other electrodes, the reaction mechanism at a carbon surface is understood as follows, where S indicates the carbon surface, and $S{-}H_{ads}$ represents hydrogen adsorbed to the carbon surface:

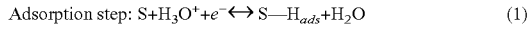
Adsorption step: $S + H_3O^+ + e^- \longleftrightarrow S{-}H_{ads} + H_2O$ (1)

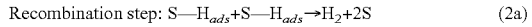
Recombination step: $S{-}H_{ads} + S{-}H_{ads} \rightarrow H_2 + 2S$ (2a)

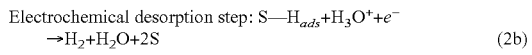
Electrochemical desorption step: $S{-}H_{ads} + H_3O^+ + e^- \rightarrow H_2 + H_2O + 2S$ (2b)

Based on the above mechanism, the rate of hydrogen evolution at a carbon surface is affected by the number of adsorption sites, chance recombination of surface-adsorbed hydrogen, and other factors, including diffusion of protons to surface-adsorbed hydrogen.

As used herein, heat treatment of carbon black generally refers to a heating process other than that used to form the carbon black. That is, heat treatment of carbon black is generally refers to a post-treatment of carbon black previously formed by methods generally known in the art, such as a furnace black process. The post-treatment occurs under inert conditions (i.e., in an atmosphere substantially devoid of oxygen), and typically occurs in a vessel other than that in which the carbon black was formed. Inert conditions include, but are not limited to, an atmosphere of inert gas, such as nitrogen, argon, and the like. Heat treatment of carbon blacks under inert conditions, as described herein, is thought to reduce the number of defects, dislocations, and/or discontinuities in carbon black crystallites and to reduce the number of surface groups on the carbon black, thereby reducing the number of adsorption sites for Reaction (1) and reducing activity of the carbon surface towards hydrogen adsorption, in turn reducing gassing and hydrogen evolution. Other advantages of heat treating carbon black for use in lead acid batteries include increasing the conductivity and hydrophobicity of the carbon black. Increased conductivity may be observed, for example, as an increase in degree of crystallinity evidenced by an increase in microcrystalline planar size ($L_a$) (i.e., size of ordered domains of microcrystalline carbon black) as determined by Raman spectroscopy. Increased hydrophobicity may be observed, for example, as a lower surface energy (SE). Excessive heat treatment, however, can result in excessive loss of total surface area (e.g., Brunauer-Emmett-Teller (BET) surface area) or external surface area (e.g., statistical thickness surface area (STSA)), such that the heat-treated carbon black no longer provides a suitable increase in charge acceptance and cycleability. Accordingly, as described herein, heat-treatment parameters may be advantageously selected to achieve a high degree of crystallinity and high hydrophobicity while maintaining a surface area suitable to provide increased charge acceptance and cycleability.

Optimal parameters for preparing high surface area heat-treated carbon blacks can be determined experimentally, such that the carbon blacks are suitable for use in, e.g., lead acid batteries to achieve high conductivity, high hydrophobicity, and reduced outgassing while maintaining improved charge acceptance and cycleability. For example, it was found that a carbon black prepared by heating a carbon black at a temperature ranging from 1100° C. to 1700° C. to yield a heat-treated carbon black having a BET surface area ranging from 100 $m^2/g$ to 1100 $m^2/g$ combined with one or more other selected properties, such as a surface energy (SE) of 10 $mJ/m^2$ or less (e.g., 9 $mJ/m^2$ or less, 6 $mJ/m^2$ or less, or 3 $mJ/m^2$ or less), a Raman microcrystalline planar size ($L_a$) of at least 22 Å and 50 Å or less (e.g., ranging from 22 Å to 50 Å, at least 25 Å, or ranging from 25 Å to 50 Å etc.) or a combination thereof, provides a carbon black suitable for use in a lead acid battery.

In some examples, the carbon black or heat-treated carbon black has a statistical thickness surface area (STSA) of at least 100 $m^2/g$ and/or less than 600 $m^2/g$, e.g., a statistical thickness surface area (STSA) ranging from 100 $m^2/g$ to 600 $m^2/g$.

In one embodiment, the carbon black prior to heating (untreated carbon black) has a surface energy of greater than 10 $mJ/m^2$ and a BET surface area of at least 200 $m^2/g$, e.g., a BET surface area of at least 300 $m^2/g$, at least 500 $m^2/g$, at least 1000 $m^2/g$, 1200 $m^2/g$, at least 1300 $m^2/g$, at least 1400 $m^2/g$, or at least 1500 $m^2/g$. In another embodiment, the carbon black, prior to the heat treatment, has a surface energy of greater than 10 $mJ/m^2$ and a BET surface area ranging from 200 $m^2/g$ to 2100 $m^2/g$, e.g., a BET surface area ranging from 300 $m^2/g$ to 2100 $m^2/g$, from 500 $m^2/g$ to 2100 $m^2/g$, from 1000 $m^2/g$ to 2100 $m^2/g$, from 1200 $m^2/g$ to 2100 $m^2/g$, from 1300 $m^2/g$ to 2100 $m^2/g$, from 1400 $m^2/g$ to 2100 $m^2/g$, or from 1500 $m^2/g$ to 2100 $m^2/g$.

In one embodiment, the heat treatment decreases the BET surface area by at least 10%, relative to the BET surface area of the untreated carbon black. In one embodiment, the BET surface area is decreased in conjunction with decreasing the surface energy. In another embodiment, the heat treatment decreases the BET surface area by at least 25% relative to the BET surface area of the untreated carbon black, e.g., by at least 30%, at least 40%, at least 50%, or by at least 65%, relative to the BET surface area of the untreated carbon black. In yet another embodiment, the heat treatment decreases the BET surface area by at least 10% to 70%, at least 25% to 70%, at least 30% to 70%, at least 40% to 70%, or by at least 50% to 70%, relative to the BET surface area of the untreated carbon black.

In another embodiment, the heat treatment increases the Raman microcrystalline planar size ($L_a$) and decreases the surface energy while decreasing the BET surface area by no more than 25%, e.g., by no more than 10%, or from 1% to 25%, 5% to 25%, from 10% to 25%, from 1% to 10%, or from 5% to 10%, relative to the BET surface area of the untreated carbon black.

Certain carbon blacks, including heat-treated carbon blacks with a selected combination of properties (e.g., high surface area, high conductivity, and high hydrophobicity) can be used in lead acid batteries to provide improved charge acceptance and cycleability as well as reduced hydrogen evolution compared to other (e.g., non-heat-treated) carbon blacks.

In some cases, heat-treated carbon black can be used in the formation of an electrode for a lead acid battery. The electrode may include, for example, an electrically conductive substrate, and a material supported by the surface of the electrically conductive substrate, where the material is a composition including lead oxide and a heat-treated carbon black as described herein. The composition may be in the form of a paste. In some cases, the composition includes 0.1 wt % to 5 wt % of the heat-treated carbon black relative to the lead oxide.

Desirable charge acceptance may be achieved when a paste for a negative electrode includes lead oxide and a heat-treated carbon black at a loading of about 1 wt % heat-treated carbon black relative to the lead oxide. It has also been found that a higher loading (e.g., about 3 wt %) is needed for carbon blacks having a lower surface area. However, electrodes with higher loadings of lower surface area carbon blacks exhibit lower cycleability than electrodes with lower loadings of the higher surface area carbon black. Thus, it is believed that a combination of better charge acceptance and better cycleability is achieved for a low loading of a high surface area heat-treated carbon black.

For example, a carbon black with an initial BET surface area of about 1500 $m^2/g$ may be heat treated under a variety of conditions to yield various heat-treated carbon blacks. In one case, heat treatment at 1300° C. may yield a carbon black having a BET surface area of 1000 $m^2/g$ that exhibits optimal performance with 1.5 wt % loading of the heat-treated carbon black. In another example, heat treatment at 1400° C. may yield a carbon black having a BET surface area of 750 $m^2/g$ that exhibits optimal performance with 2 wt % loading of the heat-treated carbon black. In yet another example, heat treatment may yield a carbon black having a BET surface area of 500 $m^2/g$ that exhibits optimal performance with 3 wt % loading of the carbon black. At a loading of 3 wt %, however, cycleability may be less than optimal. Thus, a lower limit of surface area (and thus an upper limit on the heat treatment temperature t) may be selected to yield optimal results with respect to charge acceptance and cycleablility. Similarly, it is thought that, for example, a carbon black with a lower initial BET surface area of about 250 $m^2/g$ may be heat treated under a variety of conditions to yield various heat-treated carbon blacks, and that a lower limit of BET surface area of the heat-treated carbon black may be selected such that the increased loading needed at lower surface area does not have a significant negative impact on the cycleability.

In another embodiment, an electrode having deposited thereon a material comprising the heat-treated carbon blacks disclosed herein displays lower hydrogen evolution currents. For example, electrodes coated with heat-treated carbon black samples have a hydrogen evolution current that is at least 20%, at least 25%, at least 30%, or even at least 50% lower relative to an untreated carbon black sample having a comparable BET surface area or STSA value. Comparable surface area values include those within 5% or within 10% the surface area relative to the untreated carbon black sample.

EXAMPLES

BET surface area and porosity (total pore volume) of a solid material were obtained based on physical adsorption and capillary condensation principles. At −273° C., carbon black was dosed with nitrogen at a series of precisely controlled pressures, with incremental pressure increases in a range between 0.01 and 0.3 P/P$_0$. At a pressure just below atmospheric pressure, the total nitrogen intrusion pore volume, or BET surface area, was calculated by methods known in the art. External surface area (statistical thickness surface area or STSA), associated with meso- and macropores of carbon blacks, was calculated based on the statistical thickness method as generally known in the art, in which t-plots are used to determine the average thicknesses at any point on an isotherm by multiplying the fraction of monolayer capacity, $V_d/V_m$ at that point by the thickness of the nitrogen monolayer, defined as 3.54 Å for the nitrogen molecule. Surface areas and total pore volumes reported herein were calculated in accordance with ASTM D6556-10, which is incorporated herein by reference.

Raman measurements of $L_a$ (microcrystalline planar size) were based on Gruber et al., "Raman studies of heat-treated carbon blacks," Carbon Vol. 32 (7), pp. 1377-1382, 1994, which is incorporated herein by reference. The Raman spectrum of carbon includes two major "resonance" bands at about 1340 cm$^{-1}$ and 1580 cm$^{-1}$, denoted as the "D" and "G" bands, respectively. It is generally considered that the D band is attributed to disordered sp$^2$ carbon and the G band to graphitic or "ordered" sp$^2$ carbon. Using an empirical approach, the ratio of the G/D bands and the $L_a$ measured by X-ray diffraction (XRD) are highly correlated, and regression analysis gives the empirical relationship:

$L_a$=43.5×(area of G band/area of D band), in which $L_a$ is calculated in Angstroms. Thus, a higher $L_a$ value corresponds to a more ordered crystalline structure.

The surface energy (SE) of carbon black samples was determined by measuring the water vapor adsorption using a gravimetric instrument. The carbon black sample was loaded onto a microbalance in a humidity chamber and allowed to equilibrate at a series of step changes in relative humidity. The change in mass was recorded. The equilibrium mass increase as a function of relative humidity was used to generate the vapor sorption isotherm. Spreading pressure (in mJ/m$^2$) for a sample is calculated as $\pi_e$/BET, in which:

$$\pi_e = RT \int_0^{p_0} \Gamma d\ln p$$

and R is the ideal gas constant, T is temperature, Γ is moles of water adsorbed, p$_0$ is the vapor pressure, and p is the partial pressure of the vapor at each incremental step. The spreading pressure is related to the surface energy of the solid and is indicative of the hydrophobic/hydrophilic properties of the solid, with a lower surface energy (SE) corresponding to a higher hydrophobicity.

Example 1

A furnace carbon black was treated at elevated temperatures from 1000° C. to 1600° C. for a dwell time of 1 or 2 hours at a selected temperature under an inert atmosphere (N$_2$). The treatment conditions are listed in Table 1. Values of BET surface area, external surface area (STSA), total pore volume, SE, and degree of crystallinity ($L_a$ Raman) are shown for the non-heat-treated carbon black and Samples 1A-1G, corresponding to samples heated at 1000° C. (1 hour), 1150° C. (1 hour and 2 hours), 1300° C. (1 hour), 1400° C. (1 hour), 1500° C. (1 hour), and 1600° C. (1 hour), respectively. Generally, with increasing treatment temperature, BET surface area (FIG. 2), external surface area STSA (FIG. 3), SE (FIG. 4), and total pore volume (FIG. 5) decrease, while degree of crystallinity ($L_a$ Raman, FIG. 6) increases.

TABLE 1

Properties of heat-treated carbon black.

| | Heat treatment Temperature (° C.) | Dwell time (hr) | BET surface area (m$^2$/g) | External surface area (m$^2$/g) | Total pore volume (ml/g) | SE (mJ/m$^2$) | $L_a$ Raman (Å) |
|---|---|---|---|---|---|---|---|
| Not treated | — | — | 1546 | 562 | 1.69 | 10.4 | 20.8 |
| Sample 1A | 1000 | 1 | 1504 | 563 | 1.60 | 11.4 | 21.1 |
| Sample 1B | 1150 | 1 | 1409 | 558 | 1.52 | 11.7 | 22.1 |
| Sample 1C | 1150 | 2 | 1376 | 573 | 1.51 | 10.7 | 22.4 |
| Sample 1D | 1300 | 1 | 1050 | 561 | 1.35 | 9.1 | 26.3 |
| Sample 1E | 1400 | 1 | 875 | 550 | 1.24 | 8.5 | 29.6 |
| Sample 1F | 1500 | 1 | 682 | 524 | 1.14 | 8.3 | 31.6 |
| Sample 1G | 1600 | 1 | 534 | 481 | 1.03 | 7.0 | 33.3 |

Figure 2:
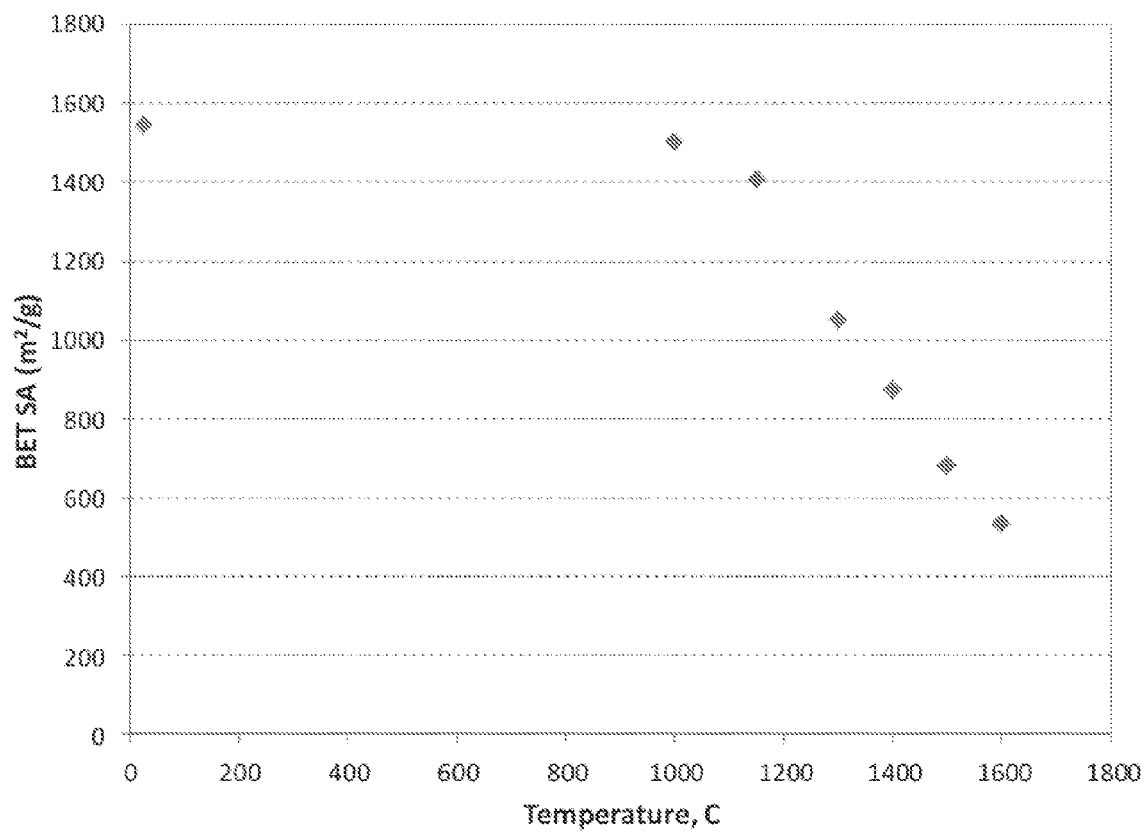
FIG. 2 is a plot showing Brunauer-Emmett-Teller (BET) surface area versus temperature for a heat-treated carbon black.
Figure 3:
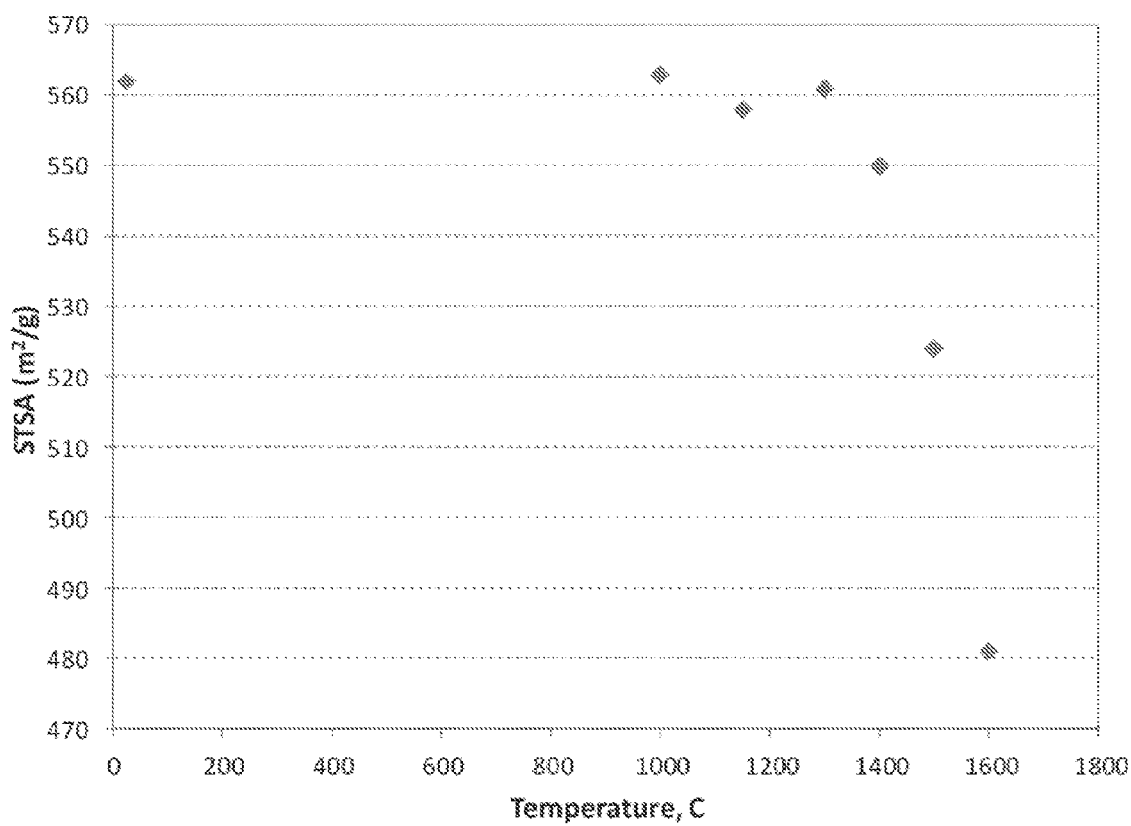
FIG. 3 is a plot showing statistical thickness surface area (STSA) versus temperature for a heat-treated carbon black.
Figure 4:
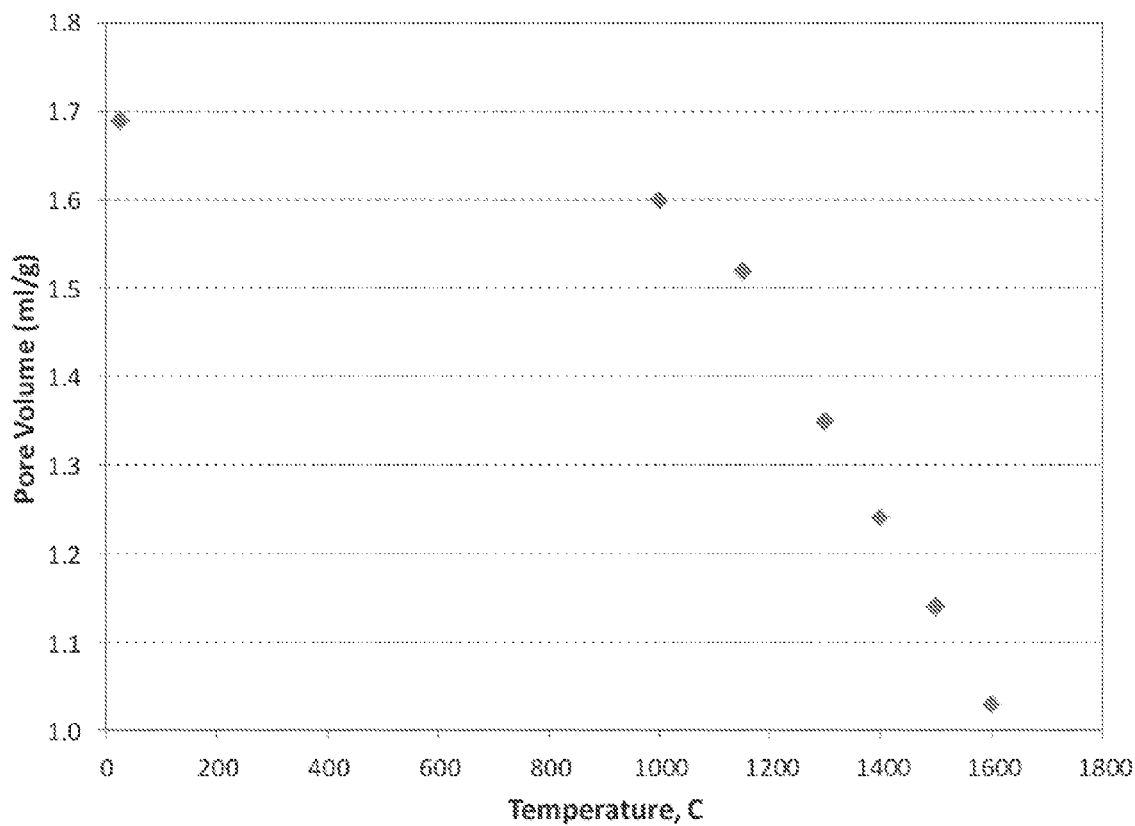
FIG. 4 is a plot showing pore volume versus temperature for a heat-treated carbon black.
Figure 5:
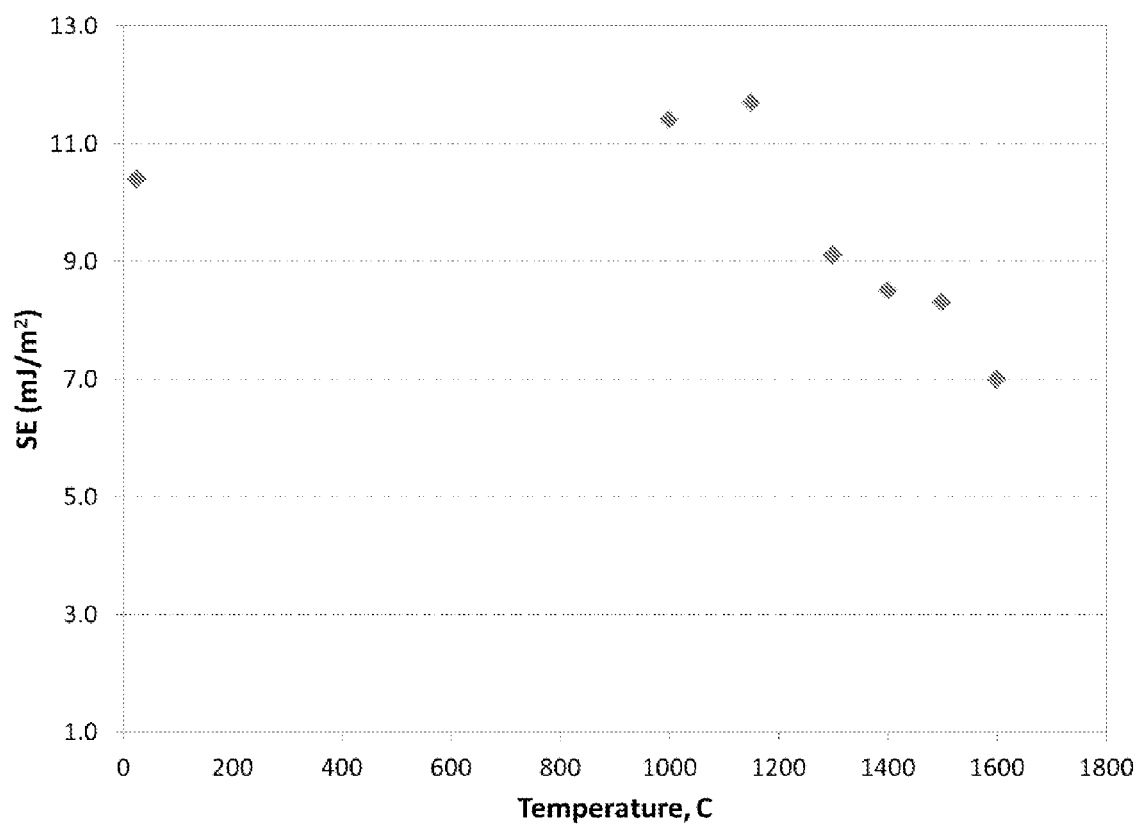
FIG. 5 is a plot showing Raman microcrystalline planar size ($L_a$) versus temperature for a heat-treated carbon black.
Figure 6:
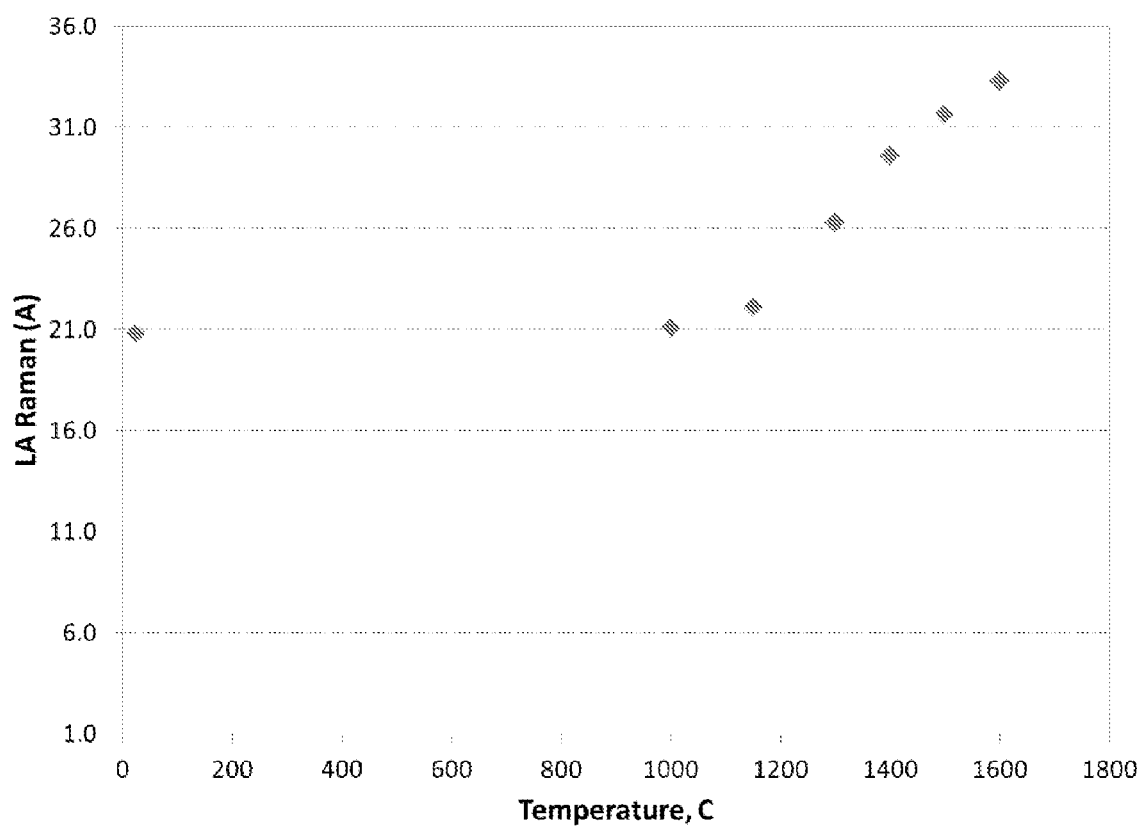
FIG. 6 is a plot showing surface energy (SE) versus temperature for a heat-treated carbon black.

Plots including values for Samples 1A, 1B, 1D, 1E, 1F, and 1G, as well as the non-heat-treated carbon black, are shown in FIGS. 2-6. As seen in FIG. 2, BET surface area decreases from 1504 m$^2$/g at 1000° C. (Sample 1A) to 534 m$^2$/g at 1600° C. (Sample 1G), with a relatively sharp decrease appearing between 1150° C. (Sample 1B) and 1300° C. (Sample 1D). As seen in FIG. 3, STSA (external surface area) generally decreases as the heat-treatment temperature increases, with a value of 563 m$^2$/g at 1000° C. (Sample 1A) and a value of 481 m$^2$/g at 1600° C. (Sample 1G), with a relatively sharp decrease appearing between 1300° C. (Sample 1D) and 1400° C. (Sample 1E). FIG. 4 shows a decrease in pore volume from 1.60 ml/g at 1000° C. (Sample 1A) to 1.03 ml/g at 1600° C. (Sample 1G). FIG. 5 shows a decrease in SE from 11.7 mJ/m$^2$ at 1150° C. (Sample 1B) to 7.0 mJ/m$^2$ at 1600° C. (Sample 1G). Thus, from a treatment temperature of 1150° C., and possibly lower, to a treatment temperature of 1600° C., hydrophobicity of the heat-treated carbon black increases with an increase in temperature. As seen in FIG. 6, the degree of crystallinity of carbon black heat treated at 1000° C. (21.1 Å) is similar to that of non-heat treated carbon black (20.8 Å). The $L_a$ value increases from 21.1 Å at 1000° C. (Sample 1A) to 33.3 Å at 1600° C. (Sample 1G). As such, the conductivity of heat-treated carbon black is also expected to increase as treatment temperature increases.

From Table 1, Samples 1D-1G are seen to have a combination of properties including a BET surface area ranging from 100 m²/g to 1100 m²/g, a SE of 10 mJ/m² or less, and a Raman microcrystalline planar size ($L_a$) ranging from 22 Å (or 25 Å) to 50 Å. The non-heat-treated sample and Samples 1A-1C are seen to have a BET surface area over 1100 m²/g, a SE over 10 mJ/cm², and a lower Raman microcrystalline planar size ($L_a$) than Samples 1D-1G.

Example 2

Figure 10:
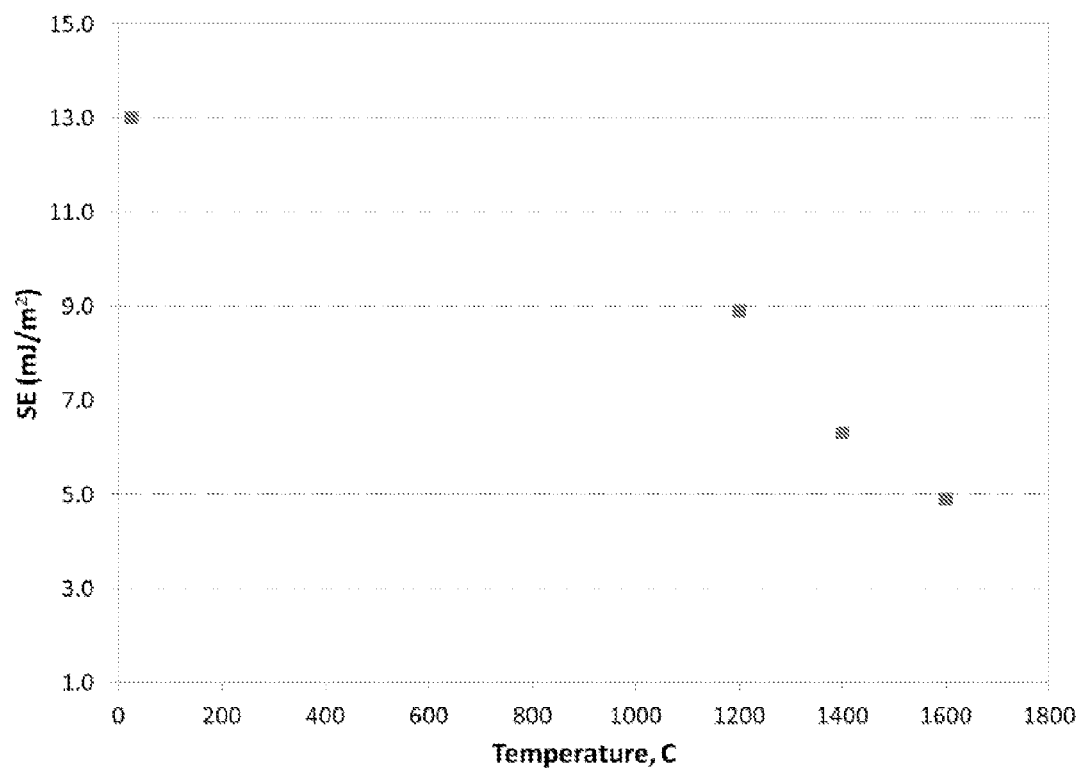
FIG. 10 is a plot showing SE versus temperature for a heat-treated carbon black.

A commercial carbon black, VXC72, available from Cabot Corporation, was heated 1200° C. for a dwell time of 2 hours and then heated at a final temperature for a dwell time of 3 hours, all under an inert atmosphere ($N_2$). The treatment conditions are listed in Table 2. Samples 2A-2C correspond to VXC72 samples heated at a final temperature of 1200° C., 1400° C., and 1600° C., respectively. Generally, with increasing final temperature, BET surface area (FIG. 7), STSA (FIG. 8), and total pore volume decrease, and degree of crystallinity ($L_a$ Raman, FIG. 9) and SE (FIG. 10) increase.

final treatment temperature increases. As seen in FIG. 10, SE decreases from about 9 mJ/m² (Sample 2A) to about 5 mJ/m² (Sample 2C).

From Table 2, Samples 2A-2C, each heated at a temperature in the range of 1200° C. to 1600° C., are seen to have a combination of properties including a BET surface area ranging from 100 m²/g to 1100 m²/g and a Raman microcrystalline planar size ($L_a$) ranging from 22 Å to 50 Å, and a SE of 9 mJ/m² or less.

Comparative Examples

BET surface area, STSA, and pore volume, and degree of crystallinity of six commercial, non-heat-treated carbon

TABLE 2

Properties of heat-treated carbon black (VXC72).

|  | Final Heat treatment Temperature (° C.) | Dwell time | BET surface area (m²/g) | External surface area (m²/g) | Total pore volume (ml/g) | $L_a$ Raman (Å) | SE (mJ/m²) |
|---|---|---|---|---|---|---|---|
| VXC72 | — | — | 240 | 145 | 0.51 | 20.4 | 13.0 |
| Sample 2A | 1200 | 5 hr at 1200 C. | 207 | 144 | 0.49 | 24.0 | 8.9 |
| Sample 2B | 1400 | 2 hr at 1200 C. 3 hr at 1400 C. | 169 | 142 | 0.49 | 28.4 | 6.3 |
| Sample 2C | 1600 | 2 hr at 1200 C. 3 hr at 1600 C. | 138 | 135 | 0.44 | 34.6 | 4.9 |

Figure 7:
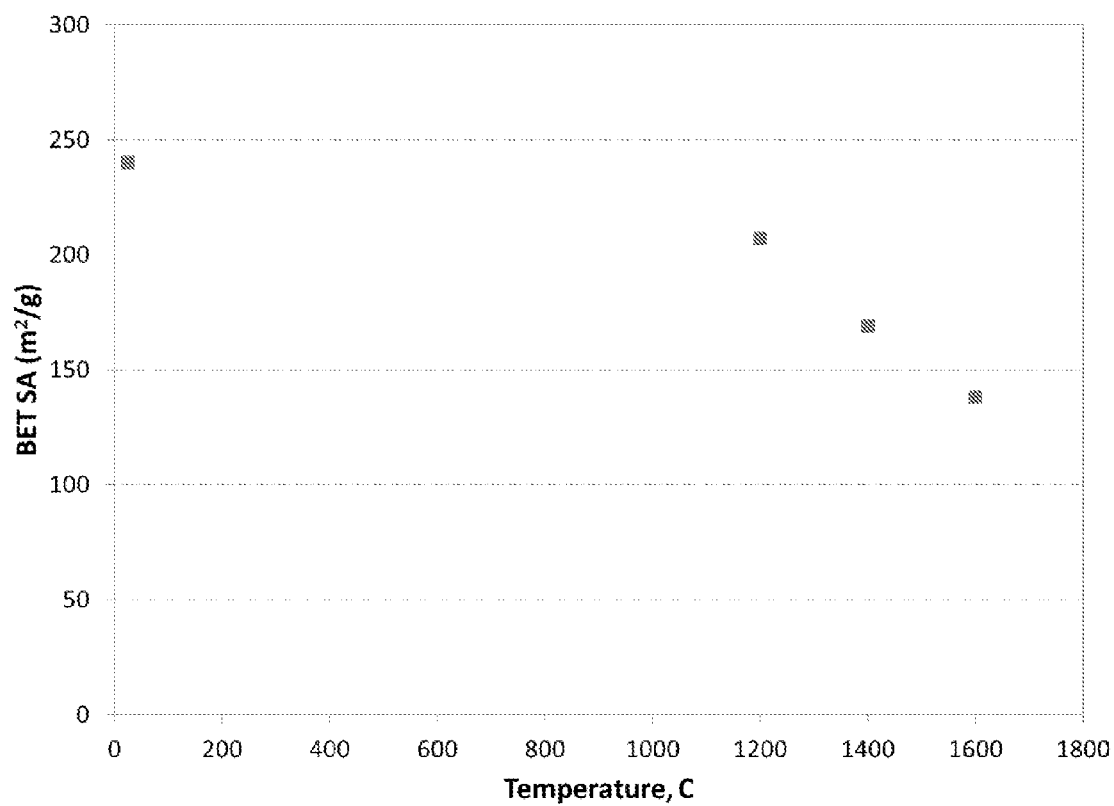
FIG. 7 is a plot showing BET surface area versus temperature for a heat-treated carbon black.
Figure 8:
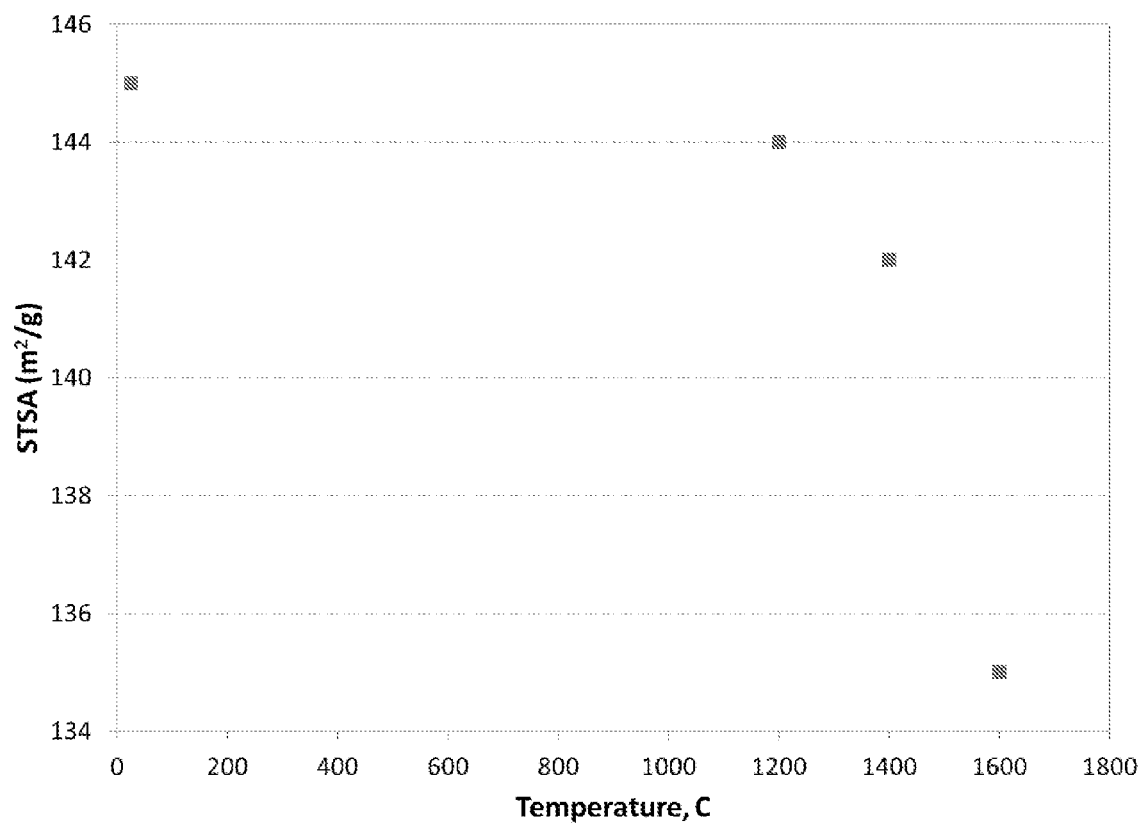
FIG. 8 is a plot showing STSA versus temperature for a heat-treated carbon black.
Figure 9:
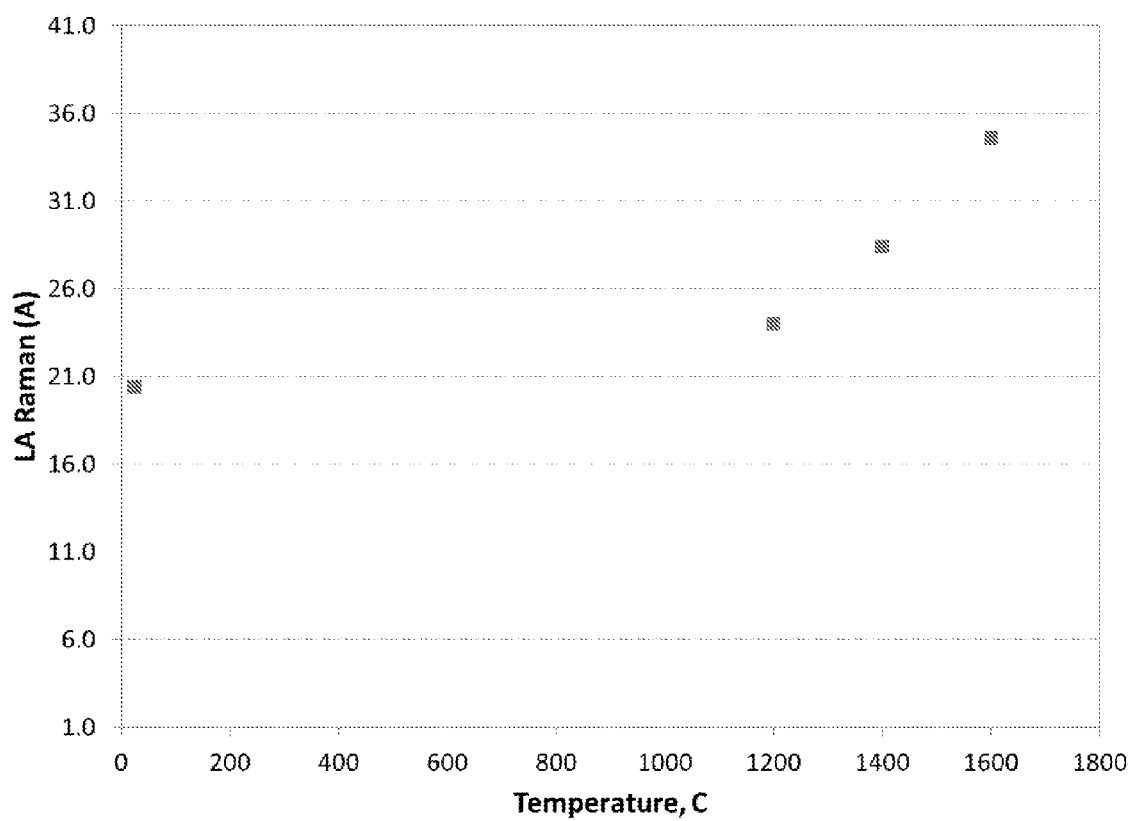
FIG. 9 is a plot showing Raman microcrystalline planar size ($L_a$) versus temperature for a heat-treated carbon black.

Plots including values for Samples 2A, 2B, and 2C, as well as non-heat-treated VXC72) are shown in FIGS. 7-9. As seen in FIG. 7, BET surface area decreases almost linearly from 207 m²/g (Sample 2A) to 138 m²/g (Sample 2C). As seen in FIG. 8, STSA (external surface area) generally decreases as the heat-treatment temperature increases, with a value of 144 m²/g (Sample 2A) and a value of 135 m²/g (Sample 2C). As seen in FIG. 9, the $L_a$ value increases from 24.0 Å (Sample 2A) to 34.6 Å (Sample 2C). As such, the conductivity of heat-treated carbon black is also expected to increase as the blacks were measured. Results are listed in Table 3. None of the carbon blacks shown in Table 3 has a combination of properties including a BET surface area ranging from 100 m²/g to 1100 m²/g and a SE of 10 mJ/m² or less.

TABLE 3

Properties of commercial, non-heat-treated carbon blacks.

|  | Manufacturer | BET surface area (m²/g) | External surface area (m²/g) | Total pore volume (ml/g) | $L_a$ Raman (Å) | SE (mJ/m²) |
|---|---|---|---|---|---|---|
| VXC72 | Cabot | 240 | 145 | 0.51 | 20.4 | 13.0 |
| BP700 | Cabot | 229 | 157 | 1.08 | 17.9 | 20.4 |
| BP2000 | Cabot | 1491 | 585 | 2.18 | 21.7 | 13.4 |
| Printex L6 | Degussa | 282 | 128 | 0.46 | 20.8 | 17.8 |
| Lamp Black 101 | Degussa | 28 | 19 | 0.05 | 19.3 | 18.9 |
| Ketjenblack EC300J | Akzo Noble | 853 | 553 | 1.13 | 23.7 | 11.8 |

Example 3

This Example illustrates the reduced gassing rates resulting from hydrogen evolution for the heat-treated carbon blacks disclosed herein, as analyzed by rotating disc electrode (RDE) measurements. The RDE method can be used for analysis of the hydrogen evolution on carbon surfaces at various potentials and temperatures. For example, the hydrogen evolution currents at fixed voltage can be used as a measure for the hydrogen evolution and compared for various carbon types as a function of surface area of the carbon versus heat treatment conditions.

Rotating disc electrode measurements were performed with a Princeton Applied Research BiStat potentiostat controlling a Pine Speed control and Pine Analytical rotator interfaced via PC using EC-Lab v10.21 software. A three electrode glass cell (Pine Analytical) was used with a platinum wire counter-electrode, calomel reference electrode, and glassy carbon working electrode coated with 100 micrograms the carbon black samples under investigation.

Electrodes were prepared by coating polished glassy carbon electrodes with 25 microliters of 4 mg/mL carbon ink prepared by adding 20 mg carbon in H2O: IPA-HPLC grade (4 mL: 1 mL) solution and sonicating for 1 minute. After drying (~1 min. at 25° C.), 12 microliters of 0.05 wt. % Nafion solution was added as binder on top of the electrode, and the electrode was dried under nitrogen for 1 h at 25° C.

The electrolyte used was $H_2SO_4$ 0.5 M purged with argon for 20 minutes prior to starting the experiment. Hydrogen reduction currents reported herein were measured at 50° C. during cyclic voltammetry (CV) scans at 20 mV/s, from −0.3 to −1V vs. SCE with 3,000 rpm disc rotation speed. The reported currents were read at −0.65V vs. SCE (−0.4V vs. SHE), normalized by weight of carbon black, and measured once a steady-state was achieved. Pre-formation cycles at 100 mV/s (usually less than 10) were performed to achieve steady state of the CV current.

The properties of the carbon black samples analyzed are outlined in Table 4 below. Samples Comp A, Comp B, and Comp C are comparative samples of furnace carbon blacks that have not been heat treated. Samples A and B are formed by heat treating Samples Comp A and Comp B, respectively, at 1300° C. for 2 h.

TABLE 4

Properties of carbon black samples

| | Comp A | A | Comp B | B | Comp C |
|---|---|---|---|---|---|
| BET-SA ($m^2/g$) | 245 | 159 | 1500 | 1043 | 1160 |
| STSA ($m^2/g$) | 159 | 162 | 482 | 533 | 410 |
| SE (mJ/m2) | 20.4 | 7.2 | 12.4 | 9.1 | 14.3 |

Figure 11:
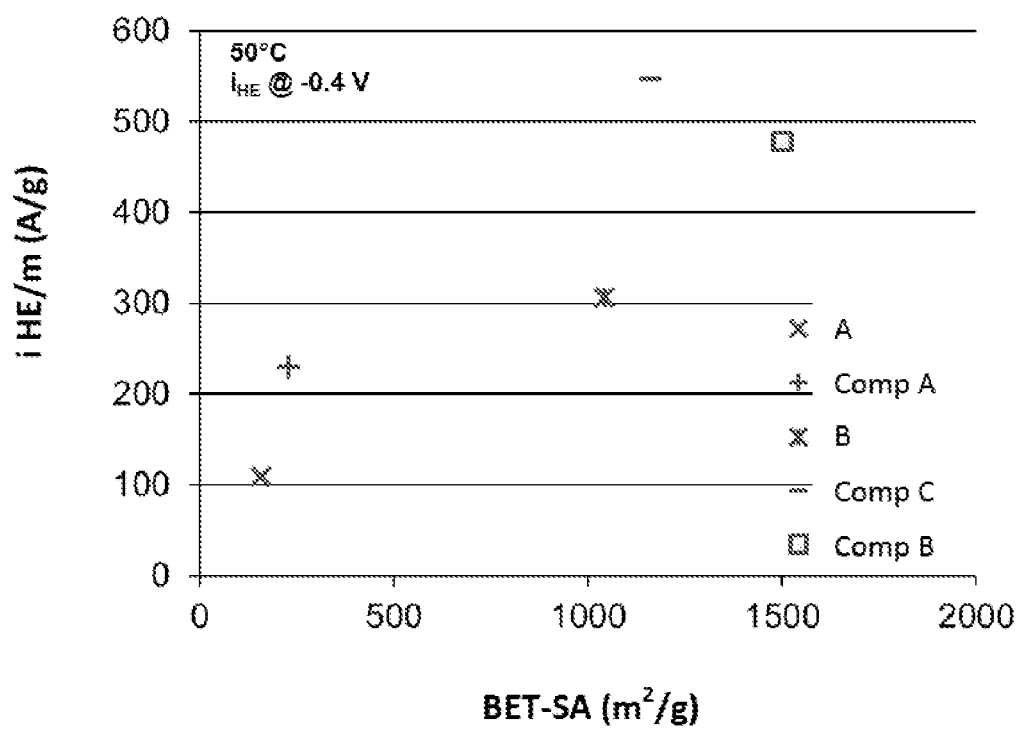
FIG. 11 is a plot showing mass-normalized hydrogen evolution current (iHE/m, A/g) at −0.4 v and 50° C. versus $N_2$ BET-SA ($m^2/g$)

FIG. 11 is a plot showing mass-normalized hydrogen evolution current (NEM, A/g) at −0.4 v and 50° C. versus $N_2$ BET-SA ($m^2/g$). In analyzing carbon blacks of comparable $N_2$ BET surface areas, it can be seen that the heat-treated carbon blacks show significantly lower hydrogen evolution currents. For example, there is more than a 50% reduction of the hydrogen evolution current when the Samples A and Comp A carbon blacks are compared. Similarly, the hydrogen evolution current for the heat treated Sample B is nearly 50% lower than the hydrogen evolution current for Samples Comp B and even Comp C, which has a similar surface area to Sample B but has not been heat treated.

Figure 12:
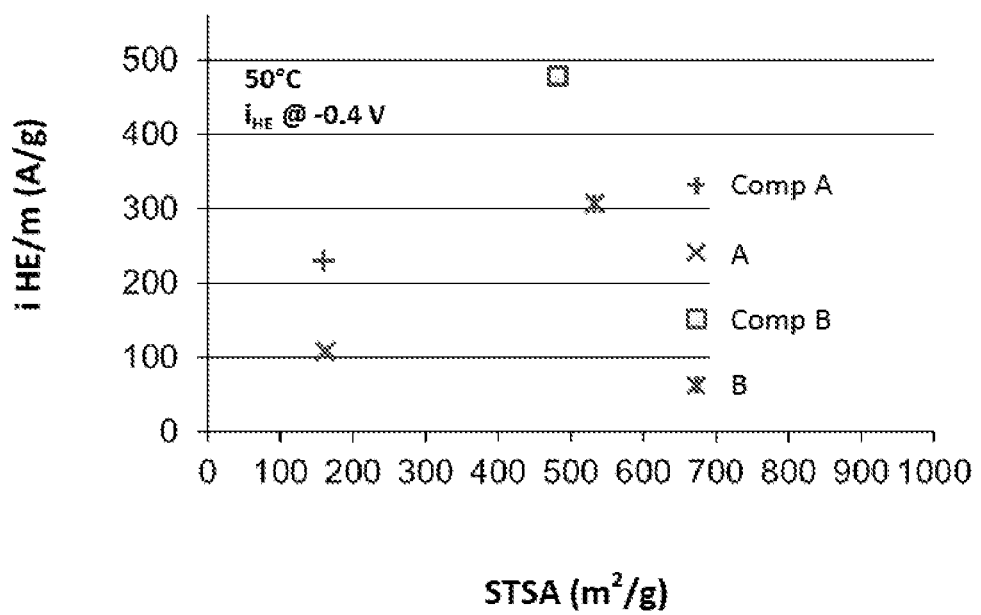
FIG. 12 is a plot showing mass normalized hydrogen evolution current at −0.4V and 50° C. versus STSA surface area ($m^2/g$).

FIG. 12 is a plot showing mass normalized hydrogen evolution current at −0.4V and 50° C. versus STSA surface area ($m^2/g$) for Samples A, B, Comp A, and Comp B. From FIG. 2 it can be seen that at comparable STSA surface area heat treated carbon blacks show significantly lower hydrogen evolution currents. For example, there is more than 50% reduction of the hydrogen evolution current when Samples A and Comp A are compared. Similarly, the hydrogen evolution current for the heat treated Sample B is nearly 30% lower than the hydrogen evolution current for Sample Comp B, which has a similar STSA value.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. An electrode comprising:
    an electrically conductive substrate; and
    a material supported by a surface of the electrically conductive substrate, the material comprising a carbon black having a Brunauer-Emmett-Teller (BET) surface area ranging from 100 $m^2/g$ to 1100 $m^2/g$, and a surface energy (SE) of 10 $mJ/m^2$ or less, and a Raman microcrystalline planar size (La) of at least 22 Å.

2. The electrode of claim 1, wherein the carbon black has a Raman microcrystalline planar size (La) of at least 25 Å.

3. The electrode of claim 1, wherein the carbon black has a Raman microcrystalline planar size (La) of 50 Å or less.

4. The electrode of claim 1, wherein the surface energy (SE) is 9 $mJ/m^2$ or less.

5. The electrode of claim 1, wherein the carbon black has a statistical thickness surface area (STSA) of at least 100 $m^2/g$.

6. The electrode of claim 1, wherein the carbon black is a heat-treated carbon black.

7. The electrode of claim 6, wherein the heat-treated carbon black is prepared by a process comprising heating a carbon black at a temperature ranging from 1100° C. to 1700° C. in an inert atmosphere.

8. A lead acid battery comprising:
    a first electrode, wherein the first electrode comprises the electrode of claim 1;
    a second electrode; and
    an electrolyte in contact with the first electrode and the second electrode.

9. A composition comprising:
    lead oxide; and
    a carbon black having a Brunauer-Emmett-Teller (BET) surface area ranging from 100 $m^2/g$ to 1100 $m^2/g$, a surface energy (SE) of 10 $mJ/m^2$ or less, and a Raman microcrystalline planar size (La) of at least 22 Å,
    wherein the composition comprises 0.1 wt % to 5 wt % of the carbon black relative to the lead oxide.

10. The composition of claim 9, wherein the composition is a paste.

11. An electrode comprising:
    an electrically conductive substrate; and
    a material supported by a surface of the electrically conductive substrate, the material comprising the composition of claim 9.

12. An electrode comprising:
an electrically conductive substrate; and
a material supported by a surface of the electrically conductive substrate, the material comprising the composition of claim 10.

13. A lead acid battery comprising:
a first electrode, wherein the first electrode comprises the electrode of claim 11;
a second electrode; and
an electrolyte in contact with the first electrode and the second electrode.

14. The electrode of claim 1, wherein the surface energy (SE) is 6 mJ/m$^2$ or less.

15. The electrode of claim 1, wherein the surface energy (SE) is 3 mJ/m$^2$ or less.

16. The electrode of claim 1, wherein the surface energy (SE) is ranges from 1 mJ/m$^2$ to 10 mJ/m$^2$.

17. The electrode of claim 1, wherein the carbon black has a statistical thickness surface area (STSA) of 600 m$^2$/g or less.

18. The electrode of claim 1, wherein the carbon black has a statistical thickness surface area (STSA) ranging from 100 m$^2$/g to 600 m$^2$/g.

\* \* \* \* \*